United States Patent [19]

Scott

[11] Patent Number: 5,139,659
[45] Date of Patent: Aug. 18, 1992

[54] AQUARIUM AIR-LIFT WATER PUMP, AERATOR, AND FILTER

[76] Inventor: Michael Scott, 9121 E. Tanque Verde #105, Tucson, Ariz. 85749

[21] Appl. No.: 640,243

[22] Filed: Jan. 11, 1991

[51] Int. Cl.⁵ .............................................. A01K 63/04
[52] U.S. Cl. .................................. 210/169; 210/221.2; 119/5; 261/77; 261/123
[58] Field of Search .............. 210/169, 221.1, 221.2; 119/5; 261/77, 123

[56] References Cited

U.S. PATENT DOCUMENTS

| | | | |
|---|---|---|---|
| 3,151,069 | 9/1964 | Halpert | 210/169 |
| 3,487,935 | 1/1970 | Lovitz | 210/169 |
| 3,511,376 | 5/1970 | Sesholtz | 210/169 |
| 3,795,225 | 3/1974 | Ogui | 210/169 |
| 3,816,026 | 6/1974 | Isaacson et al. | 417/90 |
| 3,821,514 | 6/1974 | Lambo | 219/296 |
| 3,826,371 | 7/1974 | Adamson | 210/169 |
| 3,891,555 | 6/1975 | Bennett et al. | 210/169 |
| 4,033,719 | 7/1977 | Conn et al. | 21/102 R |
| 4,152,263 | 5/1979 | Goldman et al. | 210/169 |
| 4,163,035 | 7/1979 | Gorsky et al. | 261/77 |
| 4,216,090 | 8/1980 | Dockery et al. | 210/169 |
| 4,272,372 | 7/1981 | Fonseca | 210/169 |
| 4,333,829 | 6/1982 | Walther | 210/169 |
| 4,802,980 | 2/1989 | Gilkey et al. | 210/169 |

Primary Examiner—Peter Hruskoci
Assistant Examiner—Robert James Popovics
Attorney, Agent, or Firm—David Pressman

[57] ABSTRACT

A combined water pump, aerator, and filter for an aquarium comprises a central connecting manifold 68, a vertical outer air tube (26) which extends down into a fish tank (12). Pressurized air (22) is supplied to the manifold which directs it to the outer tube. It flows down to the bottom thereof to a bubble reducer (36) which breaks the air into small bubbles. These travel by gravity up an inner, water-lift tube (28) with entrained water from the tank, thereby pumping water from the tank up the inner tube. The water-lift tube extends up into the manifold and into a turret (58A) at the top of a replaceable filter cartridge (56) above the tank; at this point the air and water separate and flow down into the housing which contains filter media (52, 54). The air exists via a hole (60) in the side of the cartridge while the water flows down via gravity through the media which filter it. The filtered water flows out via holes (62) into the bottom of the housing to a vertical heater support and outflow tube (16) and back into the tank where it is heated by a heater (72) in a conventional manner.

20 Claims, 4 Drawing Sheets

AQUARIUM AIR-LIFT WATER PUMP, AERATOR, AND FILTER

BACKGROUND

1. Field of Invention

This invention relates generally to aquariums, specifically to a water pump, aerator, and filter for an aquarium.

2. Description of Prior Art

A home or other aquarium comprises a transparent tank of water and one or more fish in the water for observation by the owner of the aquarium. The water must be artificially conditioned for the survival of the fish. Specifically, it must be cleaned or changed periodically to remove contaminants caused by waste products of the fish. Also (unless it is very shallow with few fish) it must be aerated and (unless it has only goldfish) it must be heated.

Hertofore many systems have been devised for conditioning (heating, aerating, and cleaning [filtering]) the water in an aquarium, but each has one or more significant drawbacks.

One such system, shown in U.S. Pat. No. 4,272,372 to Fonseca (1981) shows an aquarium where the water is pumped from the bottom up through the filter cartridge. This leaves the waste matter, which has been filtered out of the water, on the lower side of the filter, allowing it to remain in and thus continue to contaminate the water. Also the waste falls back into the water and recontaminates it when the pump is turned off. In addition, it is awkward and difficult to remove the contaminated filter for changing Further, when it is removed, the water in the filter spills and leaks, recontaminating the water, or requiring the owner to hold a dish (an awkward operation) to catch the runoff. Finally, the Fonseca device requires that a relatively large tube extend down into the fish bowl to accommodate the filter cartridge, thereby precluding use of the device in small jars, glasses, etc.

Bennett, Bliss, and New, in U.S. Pat. No. 3,891,555 (1975), show a filter comprising a plurality of replaceable annular filter cartridges in a dual-walled, submerged container. This device has many of the disadvantages of Fonseca's, and, in addition, is awkward and expensive to make and change.

Goldman, Goldman, and DiMarchi, in U.S. Pat. No. 4,152,263 (1979), show a heated water circulator, but it does not filter the water. Thus it must be used with an additional, separate filter, with all of its attendant disadvantages.

Gorsky, in U.S. Pat. No. 4,163,035 (1979), shows an aerator comprising an air pump, an in-the-tank aerator, and an out-of-the-tank filter. This device is awkward to install because of its many parts. Also it cannot be used with very small tanks or small jars and glasses because of its out-of-the-tank filter.

Gilkey and Gilkey, in U.S. Pat. No. 4,802,980 (1989), show a self-contained, in-the-tank filter and pump where the filtering medium is gravel, followed by charcoal and fibrous material. This system requires that a motor be placed in the tank, precluding its use in very small tanks or small jars and glasses. Also the motor creates a shock hazard.

Dockery, in U.S. Pat. No. 4,416,090 (1980), shows an air lift pump which forces water to flow through a filter at the bottom of an aquarium. As such, this device has many of the disadvantages of Fonseca's.

Isaacson and Herrin, in U.S. Pat. No. 3,816,026 (1974), shows an air-lift pump which draws water through an external filter bowl. It cannot be used with very small tanks or small jars and glasses because of its out-of-the-tank filter.

Conn and Cohen, in U.S. Pat. No. 4,033,719 (1977), show a water circulation and filter system in which an water-lift pump comprises an air tube which extends down through an water-lift tube. Air supplied to the air tube creates bubbles at the bottom of the water-lift tube. These bubbles rise, entraining water, and thereby pumping water up through and to the top of the water-lift where it passes an ultraviolet sterilizer and then goes back down into the tank via a filter. This arrangement is disadvantageous the filter is complicated to change and disassemble. Also the pumping action will continue when the filter is changed, tending to direct water at the person doing the changing, thereby making such changing messy and more time consuming. Further the air tube must be passed through the water-lift tube, thereby providing an insecure attachment so that the air tube tends to pull up and out of the water-lift tube, which tends to stop the pumping action. Finally this system requires that a bulb be placed in the tank, creating a shock hazard.

Lambo, in U.S. Pat. No. 3,821,514 (1974), shows a heating element arranged in a filter outlet passage. This device requires a large surface area and thus cannot be used in small aquariums.

Sesholtz, in U.S. Pat. No. 3,511,376 (1970), shows a filter arrangement with a heater disposed in the filter discharge passage. His device is very complicated to manufacture, having many parts, and requiring a large-volume tank.

OBJECTS AND ADVANTAGES

Accordingly, several objects and advantages of the invention are to provide an aquarium water conditioner which obviates the disadvantages of prior conditioners, specifically which is compact in size, enabling it to be used in small jars and glasses, which does not leave filtered waste matter in the water, which can be changed easily and conveniently, which does not recontaminate the water when the pump is turned off, which has a disposable filter cartridge which can be changed without leaking, which can be made relatively economically and simply, which has a self-contained filter, which can be installed easily, and which does not require that a motor or bulb be placed in the tank.

Further objects and advantages will become apparent from a consideration of the ensuing description and the accompanying drawings.

DRAWING FIGURES

DRAWING REFERENCE NUMERALS

| 10 | water conditioner | 12 | fish tank |
|---|---|---|---|
| 14 | body of 10 | 16 | heater support and outflow tube |
| 17 | water return holes | 18 | water drawing tube assembly |
| 20 | power cord | 22 | air tube |
| 24 | small container | 26 | outer (air) tube |
| 28 | water-lift tube | 30 | annular air space |
| 32 | space | 34 | holes |
| 36 | air bubble reducer | 38 | arrows |
| 40 | area at top of 10 | 42 | lid of 10 |
| 44 | flange | 46 | lid of tank |
| 48 | indentation | 50 | access hole |
| 51 | air plug | 52 | cotton |
| 54 | charcoal | 56 | disposable filter cartridge |
| 58 | lid of 56 | 58A | turret |
| 58B | central hole | 60 | air hole |
| 62 | water holes | 64 | air passageway |
| 66 | nipple | 68 | central connecting manifold |
| 70 | space | 71 | air passageway |
| 72 | heater element and thermostat | 74 | water drawing extension |
| 76 | fish screen | | |

GENERAL DESCRIPTION AND OPERATION—FIGS. 1, 2, AND 5

Figure 1:
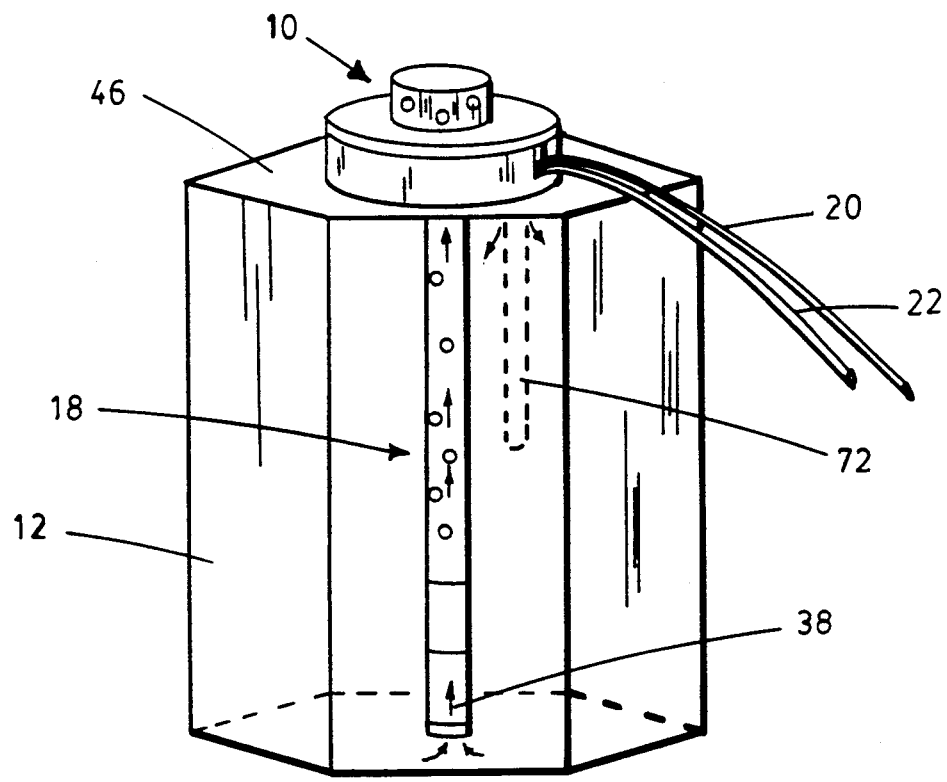
FIG. 1 is an overall perspective view of a water conditioner according to my invention installed in a large hexagonal tank.

As shown in FIG. 1, a water conditioner 10 comprising an aerator, filter, and heater according to the invention is installed in a fish tank 12. Tank 12 is a conventional hexagonal tank with a transparent top and sides. Conditioner 10 is mounted in a circular aperture (not shown) in the tank's top 46, which supports conditioner 10 above the water.

Conditioner 10 comprises (FIG. 5) a body portion 14, a heater support and outflow tube 16, a central connecting manifold 68, and a water-drawing tube assembly 18. Conditioner 10 operates by drawing water from tank 12 into the bottom of assembly 18 up through manifold 68. In body 14 the water is aerated and filtered to provide fresh water which exits via outflow tube 16 on the underside of body portion 14 back into the tank. A heater element and thermostat 72 heat the tank water in a conventional manner. Conditioner 10 is connected to a conventional air pump (not shown) which supplies pressurized air via a conventional plastic tube 22.

Conditioner 10 may be installed in any size or type of home tank.

Figure 2:
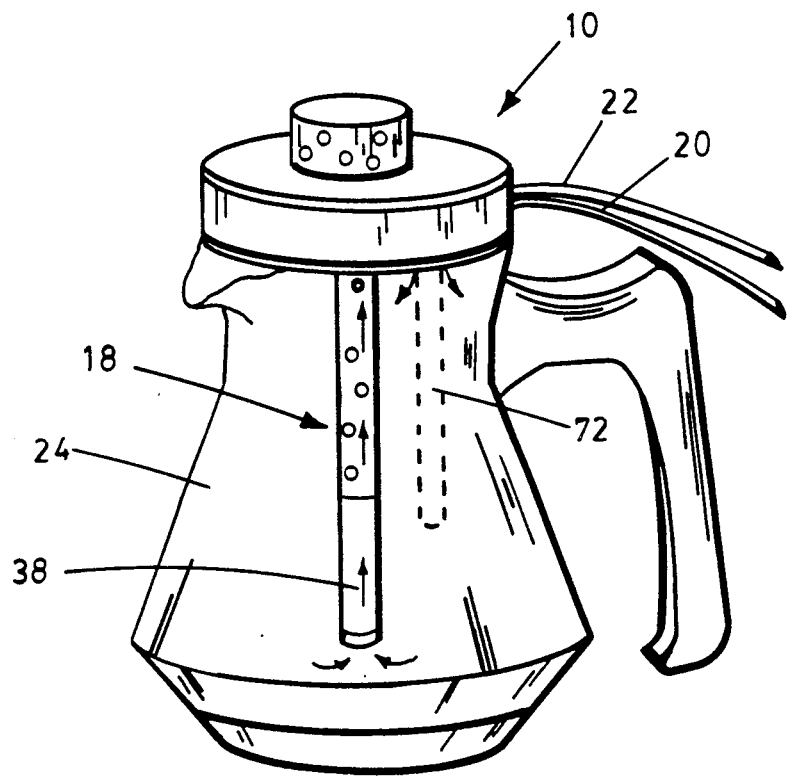
FIG. 2 is a similar view, but where the tank is a small, circular one.

In FIG. 2 it is shown installed at the top of a small, round container 24 of the type that is used for heating beverages. Conditioner 10 fits onto the top of and extends into container 24.

DESCRIPTION—FIGS. 3-4—AIR-LIFT WATER PUMP

Figure 3:
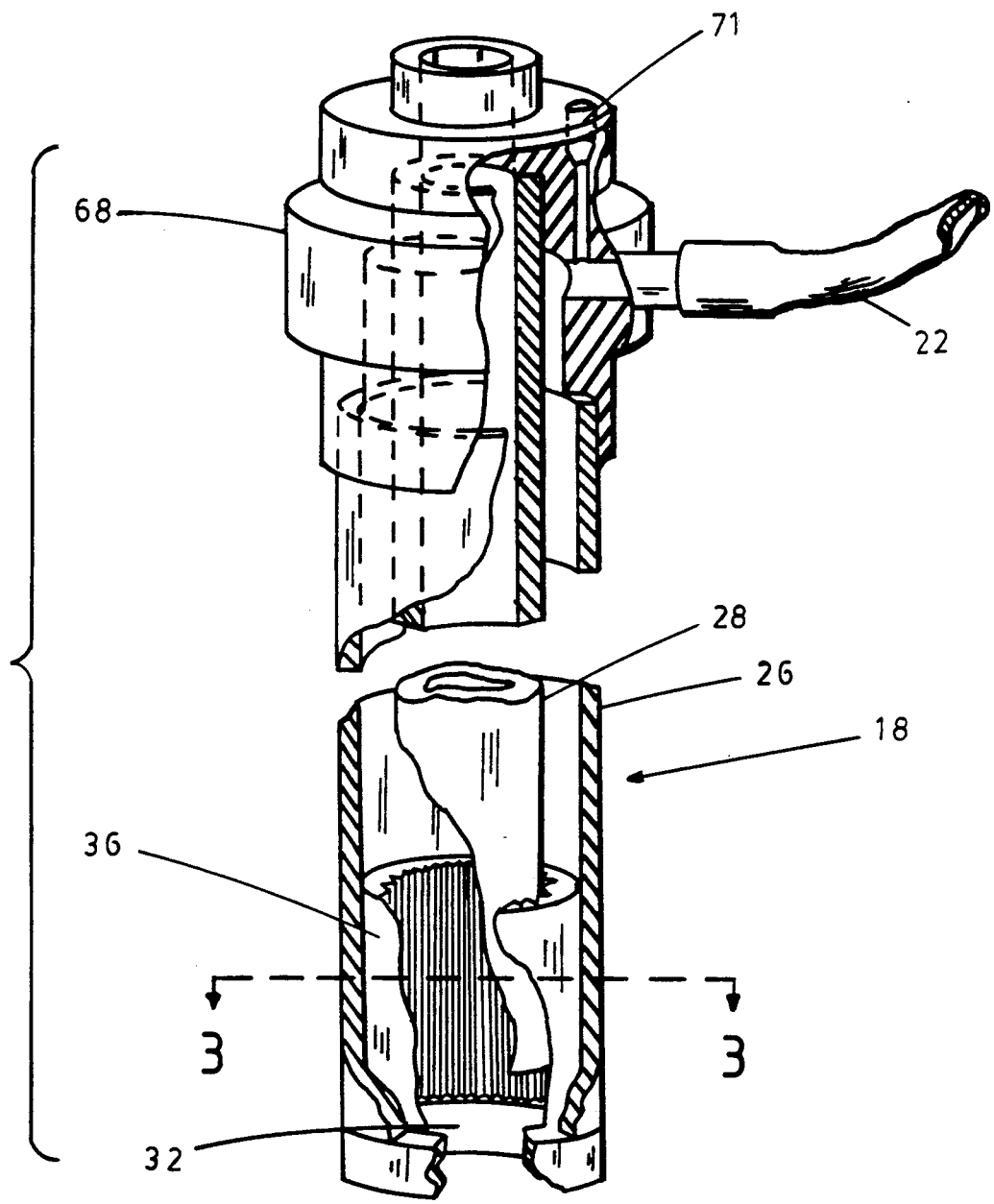
FIG. 3 is a view, partly in section, of the aerator and manifold portion of the conditioner.
Figure 4:
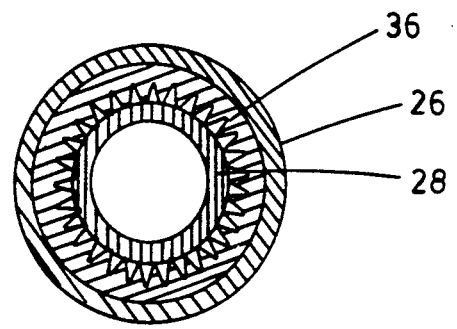
FIG. 4 is a sectional view of a bubble reducer portion of the device of FIG. 3, taken along the line 3—3 of FIG. 3.
Figure 5:
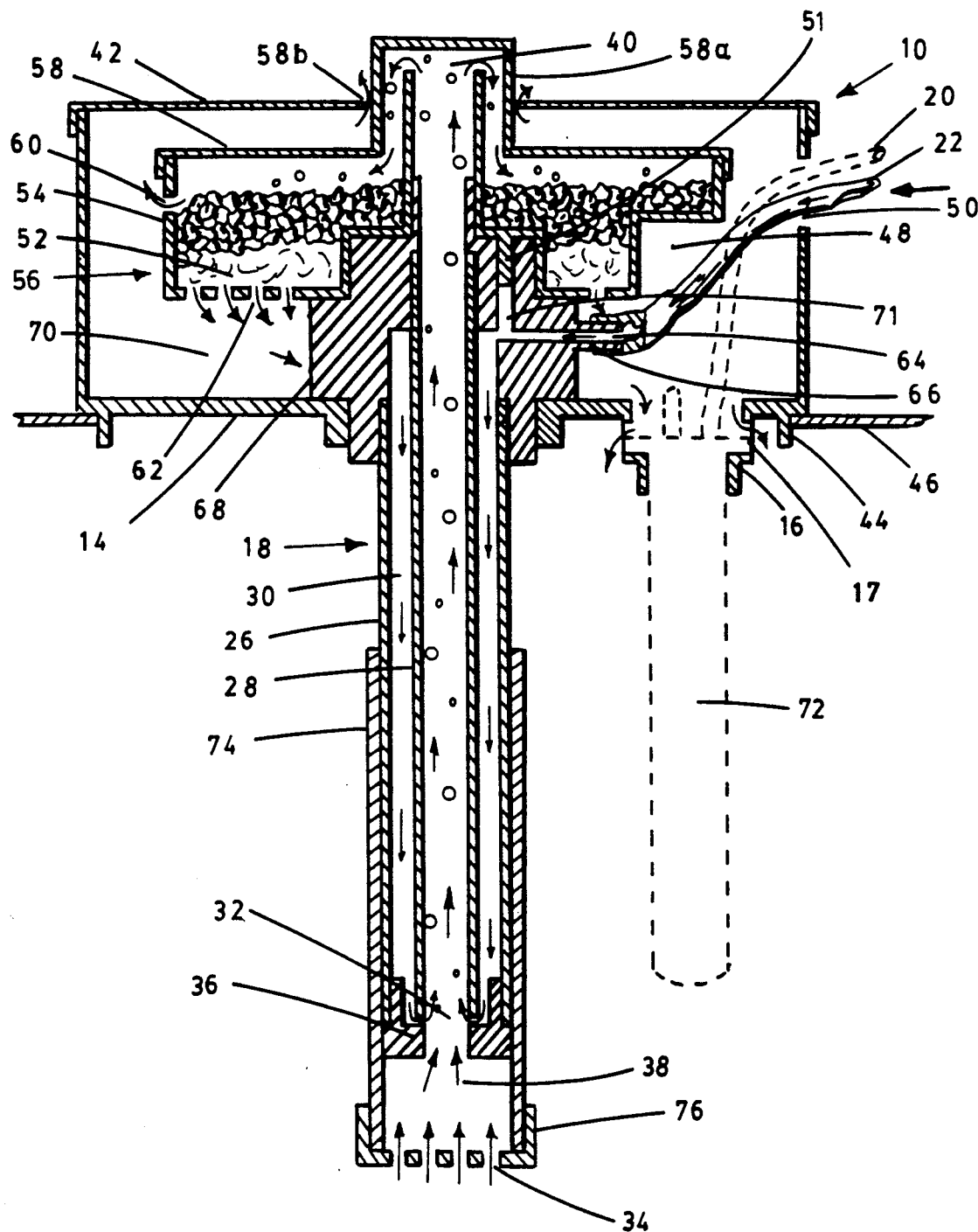
FIG. 5 is a sectional view of the entire conditioner installed in a tank.
Figure 6:
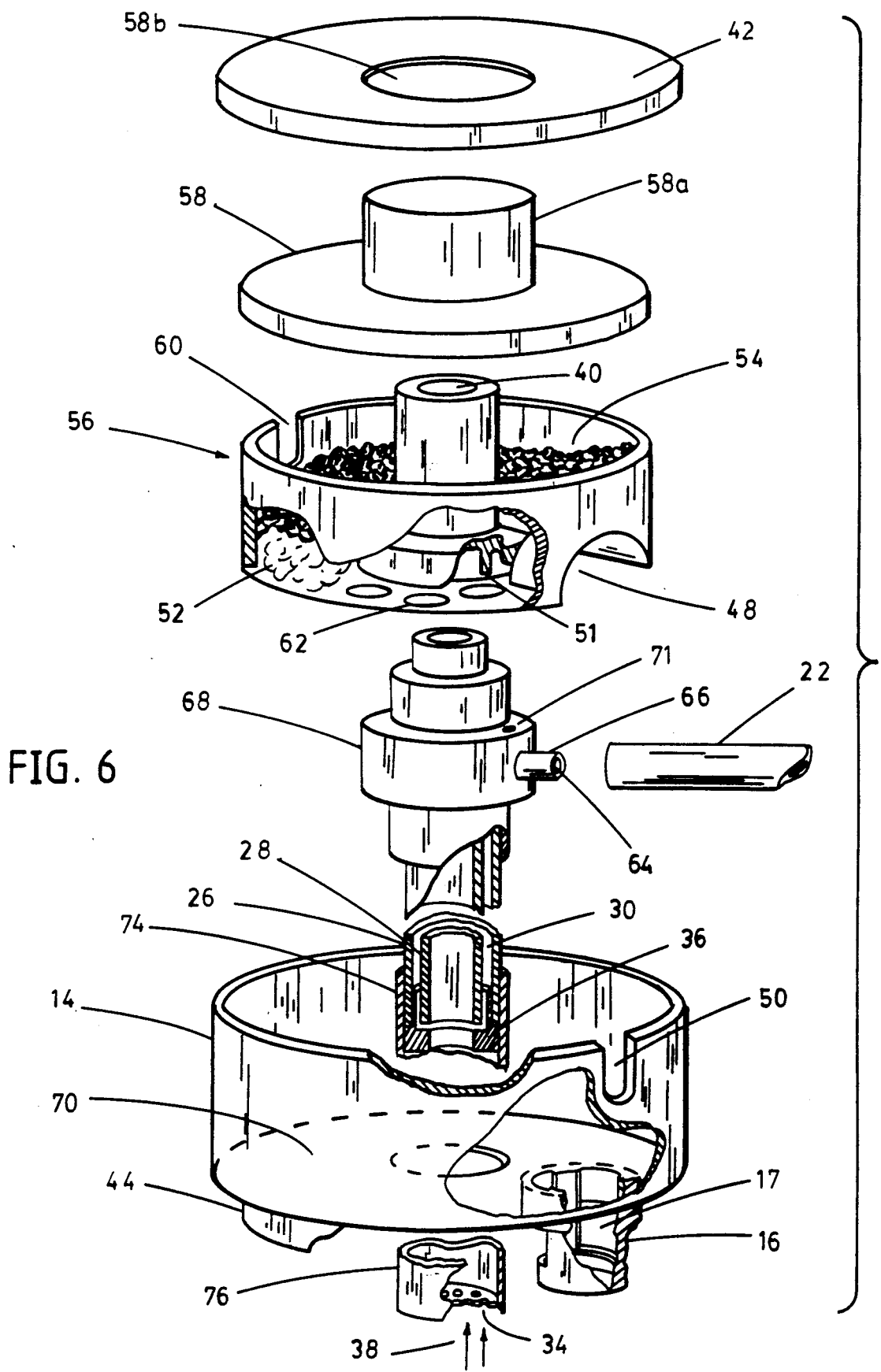
FIG. 6 is an exploded view of the top of the aerator and filter portion of the conditioner.

Body portion 14 and water-drawing assembly 18 of conditioner 10 are shown in more detail in FIGS. 5 and 6. As indicated in FIGS. 3 and 5, assembly 18 comprises an outer, air-supply tube 26 and an inner water-lift tube 28, a bubble reducer 36, an extension tube 74, and a fish screen 76. Tube 26 has a larger inside diameter than the outside diameter of tube 28 so as to provide an annular air space 30 between the two tubes. The bottom end of outer tube 26 is open and is connected to the outside of bubble reducer 36. The bottom end of inner tube 28 is also open and is connected to the inside of bubble reducer 36. Space 30 between tubes 28 and 36 is smooth, except for the bottom portion where bubble reducer 36 (FIG. 4) creates a series of narrow, vertical, triangular channels between inner tube 28 and the inside of the bubble reducer.

Water drawing extension tube 74 telescopes over bubble reducer 36 and the outside of air supply tube 26. Fish screen 76 telescopes over extension tube 74 (FIG. 5).

The conditioner may be made in any size desired, but one suitable model for small aquaria was 18 cm high from the bottom of assembly 18 to the top of central connecting manifold 68, with all other parts sized proportionately as in FIG. 5.

OPERATION—FIGS. 3-5

The conditioner operates generally as follows: Air supplied by air tube 22 (FIG. 3) flows through central connecting manifold 68 in body 10 (detailed below) and then into space 30 between tubes 26 and 28, as indicated by the downward arrows in space 30. At the bottom of space 30, bubble reducer 36 divides the downwardly flowing vertical airstream from an annular cross section to a plurality of individual narrow triangular streams.

At the bottom, the airstreams leave the bubble reducer and flow into space 32, which is filled with water from the tank. The airstreams create numerous bubbles in space 32. Since these bubbles are lighter than the water, they immediately rise into inner tube 28, which is also filled with water. When rising, they entrain and carry water upwardly, through tube 28, and then up through manifold 68, as indicated by the arrows within tube 28. Thus a continuous supply of air into tube 22 will cause a continuous flow of water upwardly through tube 28 and manifold 68. This upwardly flowing water comes from the water in the tank, as indicated by arrows 38. At the top of body 14 the water separates from the air and is filtered; it then flows back into the tank, as described infra.

DESCRIPTION—FIG. 5—FILTER

As indicated above, air pumped into manifold 68 and down through space 30 between tubes 26 and 28 is reduced to small bubbles in bubble reducer 36. Then it is forced up through inner tube 28 and manifold 68 where it entrains and carries up water. Thus a continuous supply of aerated water flows up through tube 28 and manifold 68 to an area 40 (FIG. 5) at the top of conditioner 10.

Conditioner 10 comprises a housing, circular in shape, with a lid 42 which covers body 14. Housing 10 contains a circular flange or rim 44 which is inserted into a lid 46 of the tank. Housing 10 has an indentation 48 to allow room for air-supply tube 22 and a heater power cord 20. Within housing 10 is a disposable filter cartridge 56 which has its own housing. Cartridge 56 is also circular and contains the filtering media, a layer of cotton or fiberglass 52 below a layer of charcoal granules 54. The cartridge contains its own sealed lid 58, an air hole 60 on its upper side, and a series of water holes 62 in its bottom. Lid 58 has a percolator top or turret 58A which encloses space 40 and which extends up through a central hole 58B in the top of lid 42.

Outer, air-supply tube 26 is joined to the bottom of housing 10 through manifold 68, and via an internal air passageway 64, is connected to a nipple 66 (FIG. 6) to which the end of tube 22 is attached.

The top of manifold 68 (FIG. 5) is connected to the bottom of cartridge 56. As shown by arrows 38, water is drawn up through manifold 68 in housing 10 and cartridge 56 to above lid 42, into space 40, just below the top of turret 58A.

Cartridge 56 is supported by manifold 68 which is attached to the bottom of housing 10 to connect water-drawing tube assembly 18 and form a water-return space 70. Manifold 68 contains a small connecting hole for water-lift tube 28 and a larger connecting hole for outside air tube 26. Water lift tube 28 is about 1.3 cm longer than tube 26 and extends up into central connecting manifold 68 to provide a mechanical connection. Space 70 is below holes 62 in the bottom of cartridge 56. Manifold 68 contains an air relief passageway 71 which is connected to air passageway 64 and extends up to an air plug 51 within cartridge 56.

Heater support and outflow tube 16 extends down from housing 10, on one side of assembly 18. Tube 16 contains a conventional heater element and thermostat 72 (not detailed) which are connected to a power cord 20. The bottom of tube 16 contains a plurality of water return holes 17.

OPERATION—FIG. 5

The filtering system operates as follows: Bubble-impregnated water in inner tube 28 is continuously lifted up to space 40 in turret 58A. From there it falls down into cartridge 56. At the top of cartridge 56 most of the air separates from the water to form a layer of air. This air-water separation action can be seen through turret 58A and resembles percolation. The air leaves cartridge 56 via vent 60 and goes into the space between cartridge 56 and housing 10. From there it leaves housing 10 via opening 58B. The aerated water flows through filter layers 54-52 where it is filtered and then it flows out through holes 62 in the bottom of cartridge 56. Then the water flows out from tube 16 to be returned to the tank.

EXPLODED VIEW AND FILTER REPLACEMENT—FIG. 6

Details of the parts of body 14 water conditioner and their assembly are clearly illustrated in the exploded view of FIG. 6.

Disposable filter cartridge 56 can be replaced while the unit is running. The user first lifts off lid 42 to expose cartridge 56. Lid 42 is held to the rest of body 14 by a slight friction fit. Then the user lifts up entire cartridge 56, including its lid 58. Housing 56 is held to manifold 68 by another slight friction fit. The user then turns the entire cartridge unside down so it will not leak.

When cartridge 56 is so lifted, plug 51 will open the end of passageway 71 so that air entering nipple 66 will leave by passageway 71, where it has little resistance, rather than going down passageway 64 and annular air space 30, where it has a relatively great resistance. Since no air will flow down space 30, the water-lift action will cease and no water will be pumped up tube 28. Thus the user will not risk getting wet when changing the filter cartridge.

Cartridge 56 is now removed and discarded and a new cartridge is inserted in its stead. The new cartridge will again plug the open end of passageway 71, thereby forcing air to go back down space 30 where it will restore the bubbling and pumping action again.

SUMMARY, RAMIFICATIONS, AND SCOPE

Accordingly the reader will see that, according to the invention, I have provided a water conditioner which obviates all of the aforenoted disadvantages of prior conditioners. It can be made compact in size so that it can be used in small jars and glasses, as well as in large tanks. It does not leave filtered waste matter standing in the water, but rather provides its filter media entirely above the water. Its filter media can be changed easily and conveniently. If its pump is turned off, it will not allow dirty water to recontaminate the water. Its filter can be changed without leakage of water. It can be made relatively economically and simply, it has a self-contained disposable filter cartridge which can be installed easily, and it does not require that a motor or bulb be placed in the tank. The filter cartridge can be changed while the unit is running and provides a secure connection for the air tube.

While the above description contains many specificities, these should not be construed as limitations on the scope of the invention, but as exemplifications of the presently-preferred embodiments thereof. Many other ramifications and variations are possible within the teachings of the invention. For example, the housings can be made of other shapes, such as rectangular, lid 42 can be omitted, the heater can be omitted or made separate, passageway 71 can be omitted, outside housing 14 can be replaced by suitable channels or troughs, the conditioner can be made integral with the tank or its top, the disposable cartridge can have a nonsealed lid so as to make it a permanent housing, in which case its filter media (rather than the entire cartridge) can be changed, etc. The filter media can be made of materials other than cotton, fiberglass, and/or charcoal.

Thus the scope of the invention should be determined by the appended claims and their legal equivalents, and not by the examples given.

I claim:

1. A water conditioner for an aquarium, comprising:
    an elongated outer air-supply tube,
    an elongated inner water-lift tube mounted within and coaxial to said outer air-supply tube,
    the inner diameter of said outer air-supply tube being greater than the outer diameter of said inner water-lift tube so as to provide an air-flow space between said tubes,
    said inner water-lift and said outer air-supply tube each having a bottom end and a top end,
    means for mounting said tubes so that they will extend down into the water of said aquarium when said aquarium is at least partially filled with water,
    means for supplying pressurized air to the top end of said air supply tube and into said air-flow space so that air will flow down said air-flow space and out the bottom of said outer air-supply tube,
    said bottom end of said outer air-supply tube extending below said bottom of said inner water-lift tube so that air flowing out said bottom end of said air-supply tube will flow upward by gravity into said inner water-lift tube,
    a filter unit attached to and extending at least partially around said top ends of said air-supply and said inner water-lift tubes and above the water in said aquarium when said aquarium is at least partially filled with water, said inner water-lift tube extending above said filter unit, and
    means for channeling water flowing from said upper end of said water-lift tube through said filter unit and then back into said aquarium.

2. The water conditioner of claim 1 wherein said filter unit is removable from said tubes, and further including means for stopping the flow of water from out said upper end of said water-lift tube when said filter unit is removed from said tubes.

3. The water conditioner of claim 1, further including a manifold unit connecting said air-supply and inner water-lift tubes to said filter unit, said manifold unit having an air input connection, means supplying air from said air input connection to said air-supply tube, and means for supplying water from said water-lift tube to said filter unit.

4. The water conditioner of claim 1, further including bubble reducer means for reducing air bubble sizes, said bubble reducer means being connected to said bottom end of said air-supply tube.

5. The water conditioner of claim 1 wherein said filter unit comprises a housing a filter element within said housing, said housing being removable from said tubes so that said filter unit can be replaced easily.

6. The water conditioner of claim 5 wherein said housing of said filter unit is cylindrical in shape and said tubes extend into a center of said filter unit.

7. The water conditioner of claim 1 wherein said filter unit is removable from said tubes, and further including means for stopping the flow of water from out of said upper end of said water-lift tube when said filter unit is removed from said tubes, a manifold unit for connecting said air-supply and inner water-lift tubes to said filter unit, said manifold unit having an air input connection, means supplying air from said air input connection to said air-supply tube, and means for supplying water from said water-lift tube to said filter unit.

8. The water conditioner of claim 7, further including means for reducing air bubble sizes, said means for reducing air bubble sizes being connected to said bottom end of said air-supply tube.

9. The water conditioner of claim 7 wherein said filter unit comprises a housing and a filter element within said housing, said housing being removable from said tubes so that said filter unit can be replaced easily.

10. The water conditioner of claim 9 wherein said housing of said filter unit is cylindrical in shape and said tubes extend into the center of said filter unit.

11. A water conditioner for an aquarium, comprising:
a manifold unit having air connection means for receiving pressurized air,
tube connection means on an underside of said manifold unit for connection to an air-supply tube and a coaxial water-lift tube,
water outlet means on a top side of said manifold unit for supplying a water outflow,
said air connection means being connected to said air-supply tube,
said water outlet means being connected to said water-lift tube,
an air-supply tube and a coaxial water-lift tube being connected to said tube connection means on said underside of said manifold unit, and
filter means mounted on said top side of said manifold unit for filtering water flowing from said water outlet means, said filter means being removable from said manifold unit,
said manifold unit containing outflow stoppage means for preventing an outflow of water from said water outlet means when said filter unit is removed from said manifold unit, said outflow stoppage means comprising a passageway from said air connection means to an outside surface of said manifold unit.

12. The water conditioner of claim 11, further including means for reducing air bubble sizes, said means for reducing air bubble sizes being connected to a bottom end of said air-supply tube.

13. The water conditioner of claim 11 wherein said filter means comprises a housing which is cylindrical in shape and said manifold unit is mounted below the center of said filter unit.

14. The water conditioner of claim 13 wherein said housing of said filter means has a filter element within said housing, said housing having a lid with a turret, and including a central tube extending from a bottom of said housing into said turret.

15. The water conditioner of claim 14 wherein said housing contains an aperture for returning water from said filter unit to said aquarium, said housing containing a lid with a central aperture for said turret.

16. A water conditioner for an aquarium, comprising:
a manifold unit having air connection means for receiving pressurized air,
tube connection means on an underside of said manifold unit for connection to an air-supply tube and a coaxial water-lift tube,
water outlet means on a top side of said manifold unit for supplying a water outflow,
said air connection means being connected to said air-supply tube and said water outlet means being connected to said water-lift tube,
an air-supply tube and a coaxial water-lift tube being connected to said tube connection means on said underside of said manifold unit,
filter means mounted on said top side of said manifold unit for filtering water flowing from said water outlet means, and
means for reducing air bubble sizes, said means for reducing air bubble sizes being connected to a bottom end of said air-supply tube.

17. The water conditioner of claim 16 wherein said manifold unit contains outflow stoppage means for preventing an outflow of water from said water outlet means when said filter unit is removed from said manifold unit.

18. The water conditioner of claim 17 wherein said outflow stoppage means comprises a passageway from said air connection means to an outside surface of said manifold unit.

19. The water conditioner of claim 16, further including a housing for containing said manifold unit and said filter means, said housing containing an aperture for returning water from said filter means to said aquarium.

20. The water conditioner of claim 19 wherein said housing has a lid with a turret, and including a central tube extending from a bottom of said housing into said turret.

* * * * *